Figure 1:
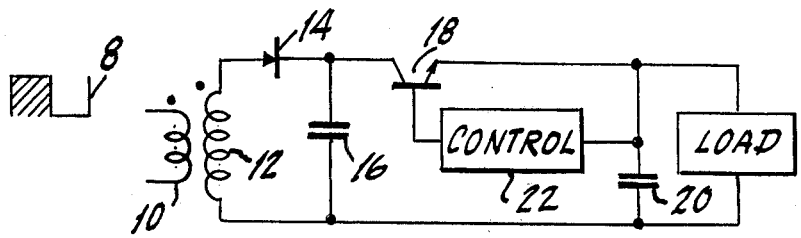

United States Patent [19]

Amin

[11] 4,122,514
[45] Oct. 24, 1978

[54] DIRECT CURRENT POWER SUPPLY

[75] Inventor: Dilip A. Amin, Parsippany, N.J.

[73] Assignee: Hewlett-Packard Company, Palo Alto, Calif.

[21] Appl. No.: 737,636

[22] Filed: Nov. 1, 1976

[51] Int. Cl.² .......................................... H02M 3/335
[52] U.S. Cl. ...................................... 363/21; 307/39; 323/DIG. 1; 363/26; 363/88; 363/124
[58] Field of Search .................... 307/31, 33, 34, 39, 307/82; 323/17, 23, 25, DIG. 1; 363/17, 20, 21, 26, 28, 85, 124, 132, 134, 88

[56] References Cited
U.S. PATENT DOCUMENTS

| 3,434,030 | 3/1969 | Bedford | 363/20 |
| 3,543,139 | 11/1970 | Greene | 307/34 X |
| 3,569,818 | 3/1971 | Dahlinger et al. | 363/21 |
| 3,571,691 | 3/1971 | Iwata et al. | 323/25 X |
| 3,621,363 | 11/1971 | Ginnman et al. | 363/20 |
| 3,624,405 | 11/1971 | Bishop et al. | 363/17 X |
| 3,681,678 | 8/1972 | Holmquest | 363/88 |
| 3,815,015 | 6/1974 | Swin et al. | 323/25 X |
| 3,935,526 | 1/1976 | Kamata et al. | 363/21 |

OTHER PUBLICATIONS

Singleton, "Wide Range Uniformly High-Efficiency DC-DC Converter," IMBTDB, vol. 15, No. 4, Sep. 1972, pp. 1359, 1360.

Primary Examiner—A. D. Pellinen
Attorney, Agent, or Firm—Donald N. Timbie

[57] ABSTRACT

A direct current voltage power supply in which spaced pulses of current are made to flow through the primary winding of a power transformer. The anode-cathode path of an SCR device is connected from a point on a secondary winding to an output capacitor. A pulse width modulation circuit and a base drive circuit are connected between the output capacitor and the gate electrode of the SCR device so as to apply a pulse to the gate electrode that enables conduction between the source and drain electrodes whenever the voltage across the output capacitor drops below a given reference value.

2 Claims, 8 Drawing Figures

DIRECT CURRENT POWER SUPPLY

BACKGROUND OF THE INVENTION

This invention relates to improvements in power supplies that provide a number of different direct current voltages by rectifying the outputs of a number of secondary windings of a power transformer. A main output direct current voltage is derived from one secondary winding and regulated by modulating the width of pulses of current flowing in the primary winding of the transformer. Auxiliary direct current output voltages are derived by rectifying the voltage at each of the other secondary windings and each is controlled by its own regulator.

Some regulators for this latter purpose have operated by varying the impedance of a transistor connected in series or shunt with the auxiliary voltage, and whereas such a circuit uses few parts, the fact that it must be able to dissipate any excess energy due to variations in the width of the current pulses in the primary winding caused by the regulation of the main direct-current voltage makes necessary the use of large expensive components.

Greater efficiency has been attained by using a transistor as a switch in a pulse width modulation circuit but more components are required thus increasing cost and size. In addition to the transistor and its control circuits the latter circuit requires a rectifier and filter between the secondary winding and the transistor as well as an output filter between the transistor and the terminals at which the direct current auxiliary voltage appears. Inefficiency is introduced and radiation increased because of the transformation of the power flowing through the circuit from A.C. to D.C. to A.C. and back to D.C.

BRIEF DESCRIPTION OF THIS INVENTION

In accordance with this invention regulation of an auxiliary output voltage is accomplished by using the SCR device as a switching means in a pulse width modulation regulation circuit in such manner that it can be directly connected between the secondary winding and the output filter. Because little power is required to trigger the SCR and no power is required to maintain conduction, and because there is only one transformation from A.C. to D.C., the circuit is not only very efficient, but it also produces less radio frequency interference. Its cost and size are less than those heretofore employed because it uses fewer parts.

THE DRAWINGS

Figure 2:
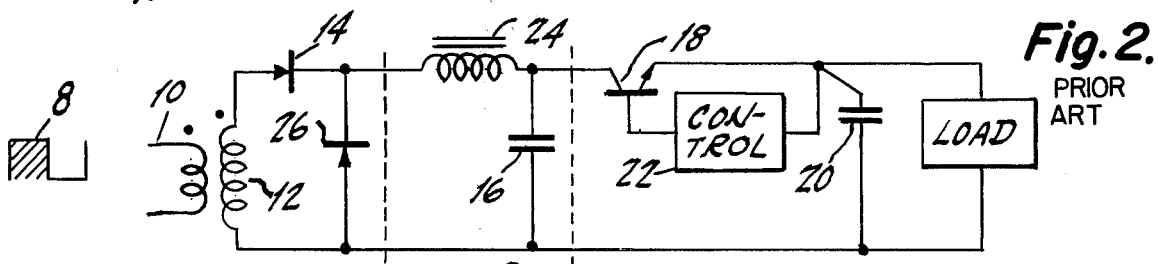
Figure 3:
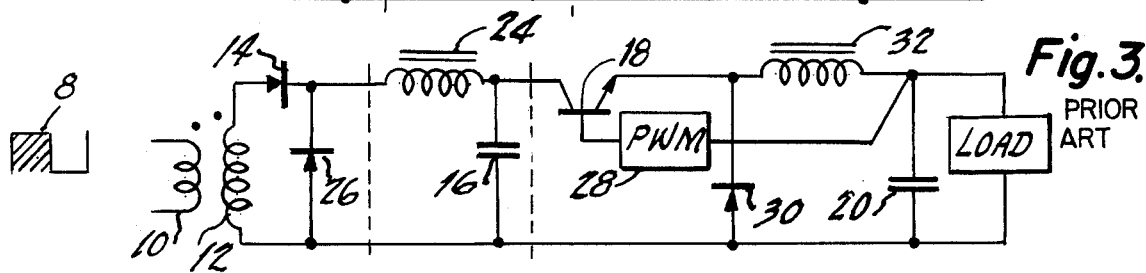
Figure 4:
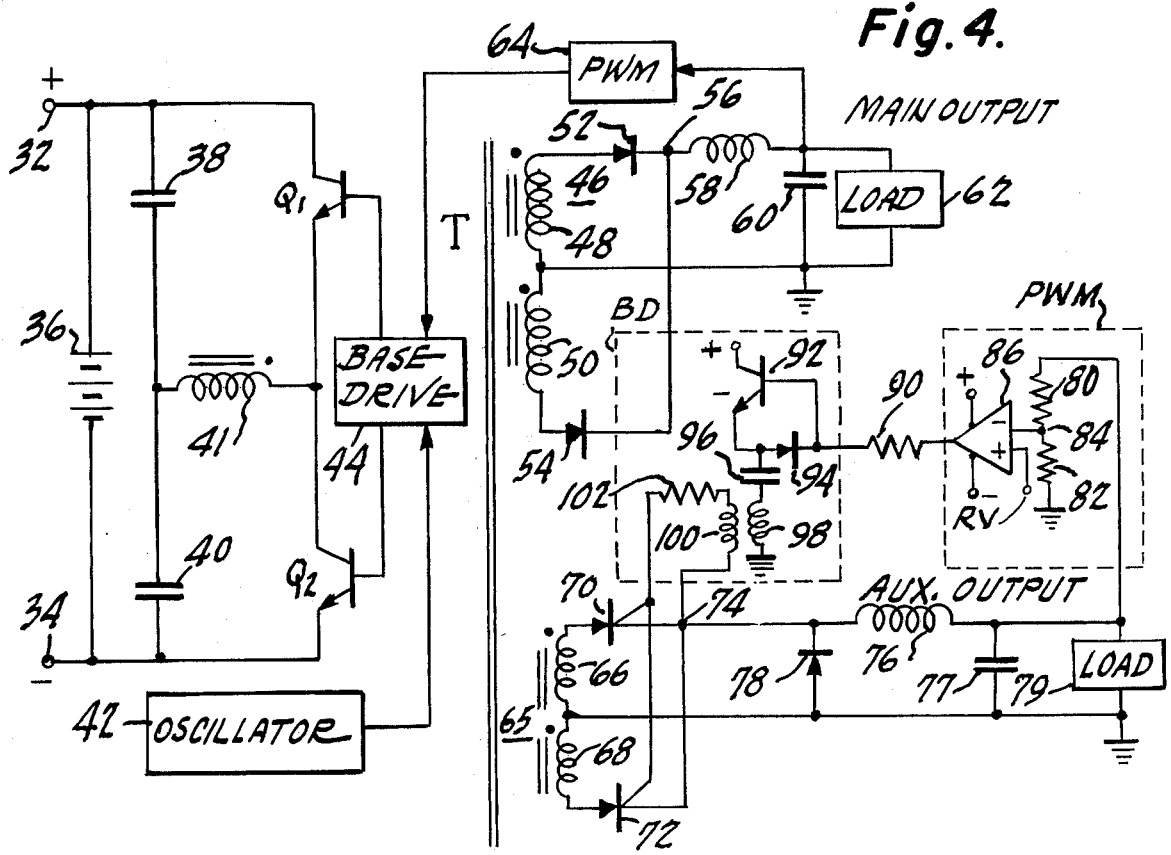
Figure 5:
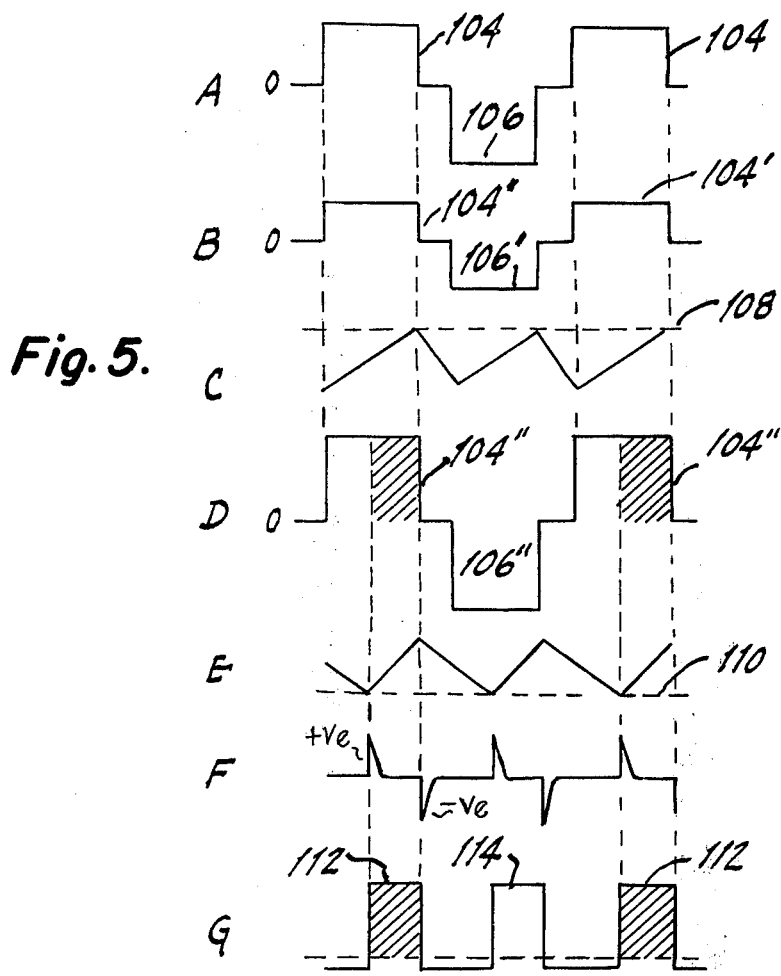
Figure 6:
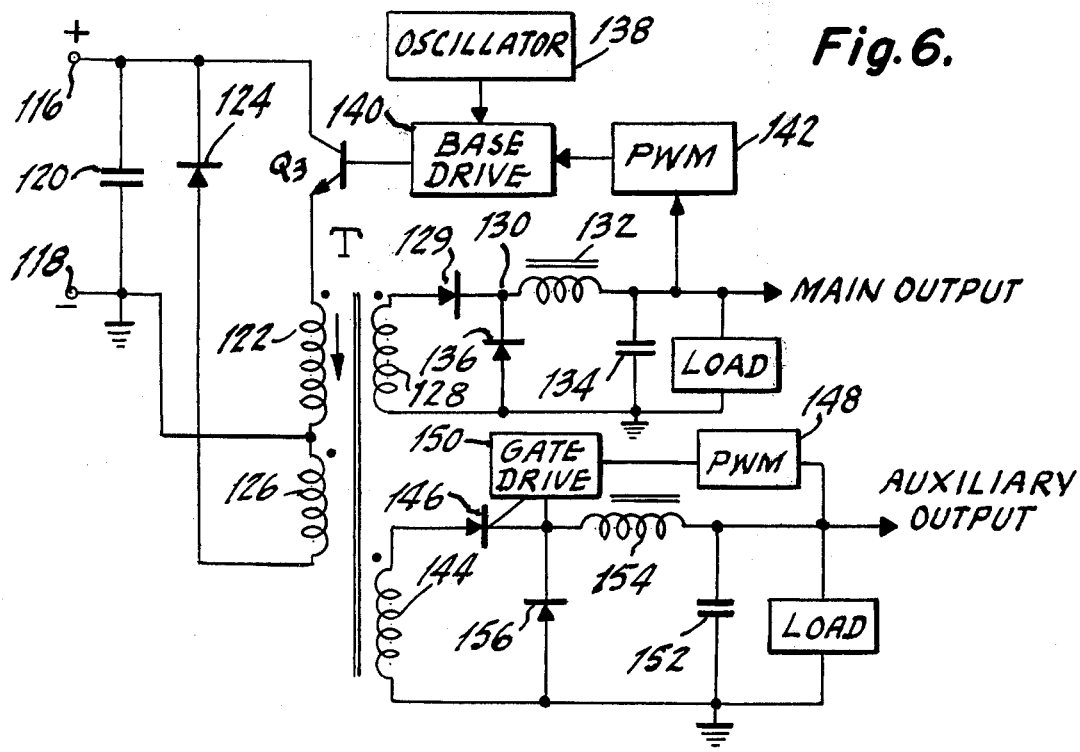
Figure 7:
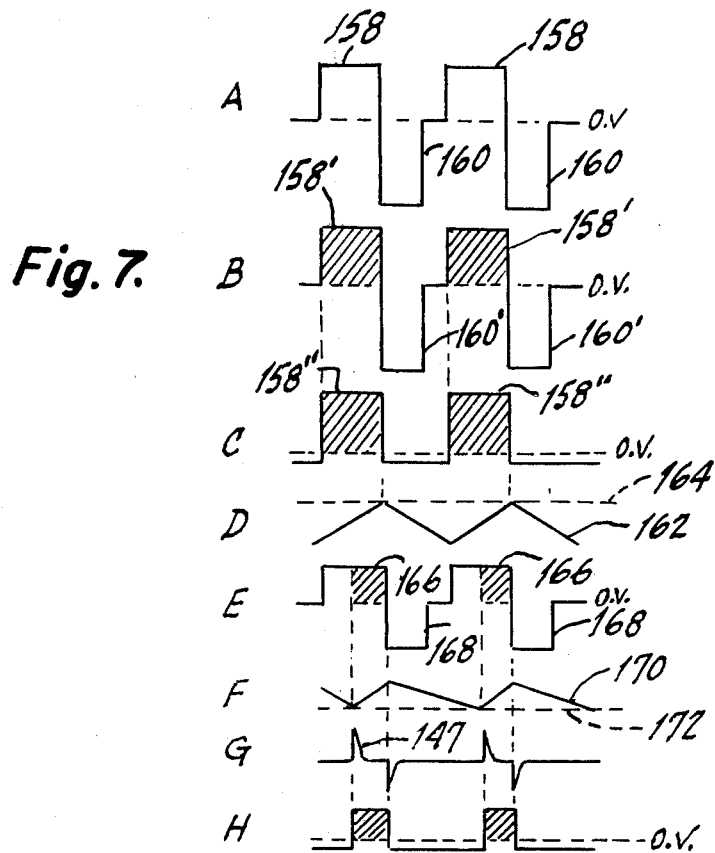

FIGS. 1 and 2 illustrate a prior art means for regulating an auxiliary D.C. output voltage that utilizes a transistor as a series pass element, FIG. 3 illustrates a prior art means for regulating an auxiliary D.C. output voltage in which a transistor is used as a switch in a circuit where regulation is achieved by pulse width modulation, FIG. 4 is a schematic diagram of a power supply of this invention having full wave operation in both the primary and secondary windings of the power transformer, FIG. 5 includes graphic representations of the waveforms at different points in the circuit of FIG. 4, FIG. 6 is a schematic diagram of a power supply of this invention having half wave operation in both primary and secondary windings of the power transformer, and FIG. 7 includes graphic representations of the waveforms at different points in the circuit of FIG. 6.

Figure 8:
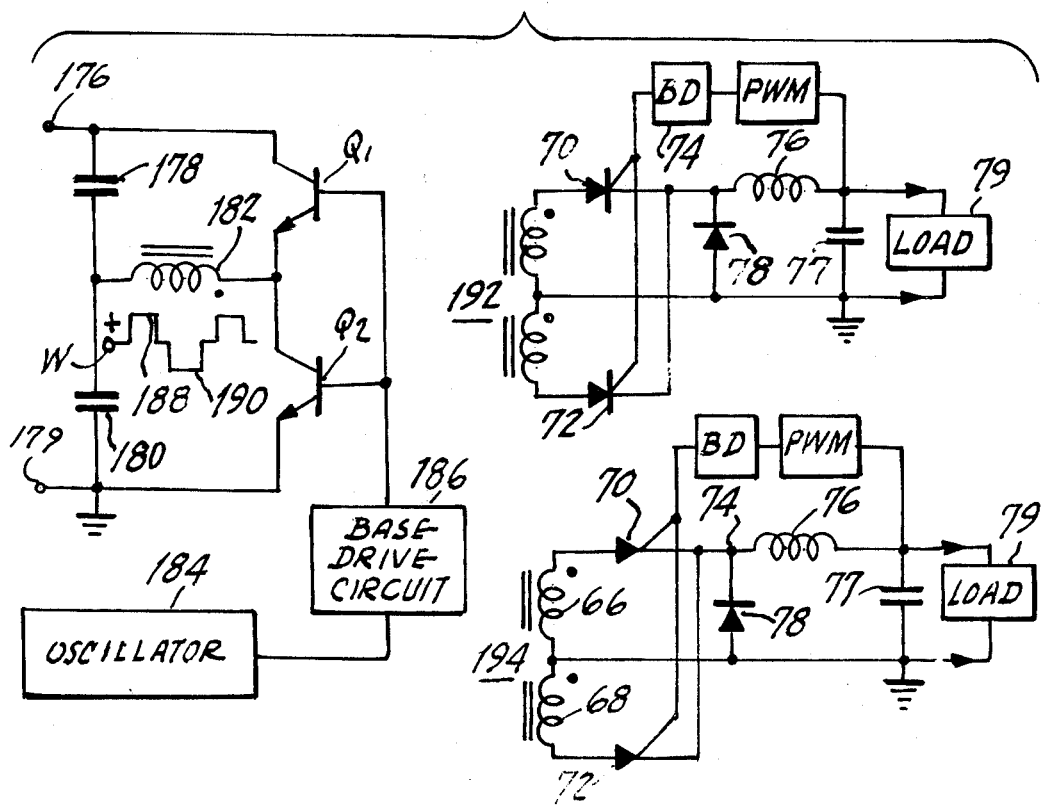

FIG. 8 illustrates a power supply in which the pulses of current in the primary winding have a constant width and wherein a separate regulating means constructed in accordance with this invention is provided in conjunction with the output derived from each secondary winding.

DESCRIPTION OF PRIOR ART

In the prior art circuit of FIG. 1, pulses of current 8 are made to flow through a primary winding 10. Their width is modulated by means not shown to regulate the D.C. output voltage. Of course, the width of the voltage pulse induced in a seondary winding 12 also varies in the same manner. Rectification of the voltage across the secondary winding 12 is effected by a diode 14, and the resulting D.C. voltage is stored on a capacitor 16. The collector-emitter path of a transistor 18 is connected between the capacitor 16 and an output capacitor 20. A control circuit 22 applies a voltage to the base of the transistor 18 so as to vary its impedance in such manner that the resulting changes in voltage across it compensate for the undesired changes in voltage that would otherwise occur at the load across the output capacitor 20.

In the prior art circuit of FIG. 2, corresponding components are indicated by the same numerals. The auxiliary output voltage across the capacitor 20 is made to have less ripple by the insertion of a filter inductor 24 which necessitates the insertion of a flyback diode 26.

In both FIGS. 1 and 2 the series regulator 18 dissipates as heat all of the input power variations due to the modulation of the width of the pulses 8 by the regulation of the main D.C. output voltage that are in excess of the power delivered to the load of the auxiliary output D.C. voltage. This reduces the overall efficiency of the supply and increases the size and cost of the components.

In the circuit of FIG. 3 components corresponding to those of FIGS. 1 and 2 are indicated by the same numerals. It achieves a higher efficiency than the circuits of FIGS. 1 and 2 by utilizing control circuits 28 that switch the transistor 18 fully on or fully off. In this circuit the A.C. power available at the auxiliary secondary winding 12 is converted to D.C. by a half wave rectifier 14, filtered, as in FIG. 2, by the inductor 24 and the capacitor 16, and then converted back to pulse form by the switching action of the transistor 18. It is then converted back to D.C. once again by the filter comprised of the inductance 32 and the output capacitor 20. Diode 30 is required to provide a path for the energy stored in inductor 32 to flow into the load when transistor 18 turns off. Although the efficiency is greater than the circuits of FIGS. 1 and 2 a number of disadvantages still remain, namely: 1. power is switched twice from one type to another rather than once so as to require a circuit of greater complexity and lower reliability, 2. the greater number of power handling components increases size and cost and reduces efficiency and reliability, 3. since the power handling components are at a minimum of three different operation voltages, they must be electrically isolated from each other if a common heat sink is to be used, and 4. bias power is required to drive the switching transistor during its conduction interval.

DESCRIPTION OF AN EMBODIMENT OF THE INVENTION

In the circuit of FIG. 4 relatively positive and negative D.C. potentials are respectively applied to input terminals 32 and 34 from any suitable source such as a battery 36. Capacitors 38 and 40 are connected in series between the terminals 32 and 34 as are the series transistors $Q_1$ and $Q_2$. A primary winding 41 of a power transformer T is connected between the junction of the capacitors 38 and 40 and the junction of the transistors $Q_1$, $Q_2$. Positive spaced pulses supplied at a super audible rate, e.g., $40KH_z$, by an oscillator 42 are alternately applied to the base electrodes of $Q_1$ and $Q_2$ by a base drive circuit 44 in a well known manner so as to make $Q_1$ and $Q_2$ conduct during alternate spaced intervals. When $Q_1$ conducts, a pulse of current flows from the positive terminal 32, through $Q_1$, the primary winding 41 and the capacitor 40 to the negative terminal 34. When $Q_2$ conducts, a pulse of current flows from the terminal 32 through the capacitor 38, the primary winding 41 and $Q_2$ to the negative terminal 34. The current flows through the primary winding 41 in opposite directions during alternate spaced intervals. Each of the transistors $Q_1$ and $Q_2$ acts by itself as a switch that places the primary winding 41 in current conducting relationship between the input terminals 32 and 34 when in a first position and in non current conducting relationship when in a second position.

The main output D.C. voltage is derived from a center tapped secondary winding 46 having sections 48 and 50 which are polarized as indicated by the dots. Diodes 52 and 54 are respectively connected with like polarity between the remote ends of the winding sections 48 and 50 and a point 56 so as to form a full wave rectifier. An inductor 58 is connected between the point 56 and the ungrounded end of the output capacitor 60 so as to form a smoothing filter. A load 62 may be connected across the output capacitor 60. The oscillator 42, the pulse width modulation circuit 64, the base drive circuit 44 and either or both of the transistors $Q_1$ and $Q_2$ are one known means for modulating the width of the pulses of current flowing in the primary winding 41 so as to regulate the amplitude of the main direct current voltage across the capacitor 60. Stated in another way, the pulse width modulation circuit 64, the oscillator 42 and the base drive circuit 44 are one known means for controlling the relative amount of time that either the switch $Q_1$ or the switch $Q_2$ is in one position or the other in response to the main output voltage.

An auxiliary D.C. output voltage is derived from another secondary winding 65 having winding sections 66 and 68 poled as indicated by the dots. Switching means, herein shown as SCR devices 70 and 72, are respectively connected in like polarity between the remote ends of the winding sections 66 and 68 and a point 74 in a full wave rectifier configuration. In contrast with the prior art circuit of FIG. 3, wherein a rectifier 14 and filter 24, 16 are connected between the switch 18 and the secondary winding 12, the switches of FIG. 4, illustrated as being SCR devices 70 and 72, are directly connected to the secondary windings 66 and 68 respectively. The characteristic of the SCR that permits such an advantageous direct connection is that, unlike a transistor, the relative bias voltages that might appear at the three electrodes during operation of the circuit cannot cause damage or malfunction. Other devices having a similar characteristic might be used as a switch, but the SCR devices have an additional advantage of requiring little power to initiate conduction and no power to continue their conduction, and they turn off when the current applied to their anode-cathode path ceases. An inductor 76 is connected between the point 74 and the ungrounded end of an output capacitor 77 so as to form a filter for the auxiliary output voltage and a flyback diode 78 is connected between the point 74 and ground to provide a conduction path for the energy stored in inductor 76 to flow when SCR 70 and 72 are off. A load 79 may be connected in parallel with the capacitor 78.

Regulation of the auxiliary output voltage across the load 79 is achieved in the following manner. A pulse width modulation circuit contained within the dotted rectangle PWM is comprised of series resistors 80 and 82 connected in parallel with the capacitor 77 so that a fraction of the auxiliary D.C. output voltage appears at their junction 84. The inverting input of an operational amplifier 86 is connected to the junction 84, and its noninverting input is connected to a point of reference voltage that is equal to the voltage at the junction 84 when the auxiliary D.C. output voltage across the load 79 has its minimum desired value. The output of the amplifier 86 is connected to a base drive circuit contained in the dotted rectangle BD via a resistor 90. The resistor 90 is connected to the base electrode of a transistor 92 and the cathode of a diode 94. The collector of the transistor 92 is connected to a point of positive potential and its emitter electrode is connected to the anode of the diode 94 and to ground via the series combination of a capacitor 96 and a primary winding 98 of a pulse transformer. One end of the secondary winding 100 of the pulse transformer is connected via a current limiting resistor 102 to the gate electrodes of the SCR devices 70 and 72, and the other end is connected to the point 74. As will be explained with the aid of the waves of FIG. 5, the auxiliary output voltage across the load 79 is regulated by causing the SCR devices 70, 72 to conduct when the voltage reaches a reference value.

OPERATION

In FIG. 5, the voltage across the primary winding 41 of the transformer T is illustrated by the wave A in which the positive pulses 104 occur at the end of the winding indicated by the dot during the conduction of $Q_1$ and the negative pulses 106 occur at the same end of the winding during the conduction of $Q_2$. Corresponding positive and negative voltage pulses 104' and 106' appear across the secondary winding sections 48 and 50 as indicated by the wave B. The relative amplitudes depend on the turns ratio and the polarity is indicated by the dots. During the positive pulses 104', the diode 52 conducts so as to charge the capacitor 60 in a positive direction, as indicated by the wave C, until the voltage reaches the maximum reference level indicated by the dotted line 108. At this point the pulse width modulation circuit 64 terminates the pulse applied at that time to the base of $Q_1$ and causes $Q_1$ to cease conducting. The voltage across the capacitor 60 falls until the oscillator 42 and the base drive 44 cause $Q_2$ to start conducting so as to produce pulses 106 and 106'. During these pulses, the capacitor 60 is charged through the diode 54 until the voltage again reaches the reference maximum of the dotted line 108. Between the pulses 104 and 106 neither $Q_1$ nor $Q_2$ conducts. The pulses 104 and 106 start at periodic intervals determined by the oscillator 42, but their duration depends on how long it takes to charge the capacitor 60 to the reference maximum value indicated by the dotted line 108.

As indicated by the wave D positive pulses 104" corresponding in duration to 104' and 104, and negative pulses 106" corresponding in duration to 106' and 106 are induced across the secondary winding sections 66 and 68 of the auxiliary voltage supply. Their amplitude may differ from that of the pulses 104' and 106' in wave B becuase of a different turns ratio. Unlike the diodes 52 and 54, the switching means, namely SCR devices 70 and 72, do not conduct just because a positive voltage is applied to them from the winding sections 66 or 68 respectively, but require in addition the application of a positive pulse to their gate electrodes. Such pulses are derived in the following way. Whenever the output voltage across the capacitor 77 drops below the desired minimum value as indicated by the dotted line 110 of the wave E, the voltage at the junction 84 of the resistors 80 and 82, and therefore the voltage at the inverting input of the amplifier 86, becomes less than the reference voltage applied to the noninverting input. This causes a positive pulse to appear at the output of the amplifier 86 and at the base electrode of the transistor 92 so as to cause it to conduct and quickly charge the capacitor 96 through the primary winding 98 of the pulse transformer. The positive pulses of voltage induced in the secondary winding 100, and illustrated in the wave F, are applied to the gate electrodes of both the SCR devices 70 and 72. During the pulse 104" the SCR device 70 conducts, as indicated by the shaded areas, because the voltage wave 104" applied to it is positive. But the SCR device 72 cannot conduct during this time because the voltage applied to its source electrode during the pulse 104" is negative. When the polarities are reversed during the pulses 106, 106' and 106", the SCR device 72 conducts and the SCR device 70 is off, but in order not to confuse the drawings, no shaded area is shown to represent this. The capacitor 77 across which the auxiliary output D.C. voltage appears is charged through the SCR device 70 as indicated by the shaded pulses 112 of the wave G and by the SCR device 72 as indicated by the unshaded pulses 114.

When the pulses 104" or 106" are terminated by the regulation circuit for the main output D.C. voltage, the voltage across the capacitor 77 starts to decline from its maximum vlaue and causes the amplifier 86 to supply a negative voltage via the diode 94 so as to discharge the capacitor 96 through the primary winding 98 and induce negative going pulses that are illustrated in the wave F in the secondary 100. These negative pulses are applied to the gate electrodes of the SCR devices 70 and 72. Provision of this negative pulse is required because some SCR devices have a characteristic such that the rapid rate of change of voltage in the negative direction at the output of one of the devices might cause false triggering of the other device.

Whenever the SCR devie 70 or the SCR device 72 ceases to conduct, the collapse of the magnetic field associated with the filter inductor 76 would start to product a high voltage; however, the flyback diode 78 begins to conduct and provide a discharge path when neither SCR device conducts. It is necessary to use a flyback diode to continue current flow in the load and prevent possible damage to the SCR devices.

DESCRIPTION OF AN EMBODIMENT HAVING HALF WAVE OPERATION

In the power supply schematically illustrated in FIG. 6 a direct current voltage is applied between input terminals 116 and 118 with the indicated polarity. Between the terminals 116 and 118 there is connected a capacitor 120, the series combination of the collector-emitter path of a transistor $Q_3$ and a primary transformer winding 122, and the series combination of a flyback diode 124 and a flyback winding 126.

The main D.C. output voltage is derived from a secondary transformer winding 128 having one end at ground and the other end connected by a diode 129 to an input terminal 130 of a filter comprised of an inductor 132 and the output capacitor 134 which is connected in series between the terminal 130 and ground. A flyback diode 136 is connected between the input terminal 130 and ground. A load 135 may be placed in parallel with the capacitor 134.

Regulation of the main output voltage is achieved by recurrently initiating conduction in the transistor $Q_3$ by applying positive pulses of constant frequency from an oscillator 138 to its base electrode via a base drive circuit 140. With the winding polarities indicated by the dots, this causes the diode 129 to conduct and build up the main D.C. output voltage across the output capacitor 134. As in the circuit of FIG. 4, when this voltage reaches the designated maximum, a pulse width modulation circuit 142 terminates the pulse then being applied to the base electrode of $Q_3$ so that it no longer conducts. As the magnetic field of the transformer T collapses, it induces a voltage in the flyback winding 126 which is discharged in a well known manner by current that flows through the flyback diode 124. This induces a negative voltage pulse at the end of the secondary winding 128 designated by the dot so that the diode 129 does not conduct and output capacitor 134 continues to discharge. As the magnetic field of the inductor 132 collapses, current continues to flow through the load and the flyback diode 136.

Turning now to the production of the auxiliary D.C. output voltage from the secondary winding 144 of the transformer T, it is seen that when $Q_3$ is conducting, a voltage pulse is applied to the anode path of an SCR device 146 from the secondary winding 144 with such polarity as to tend to make it conduct. However, conduction cannot occur until a positive pulse is applied to the gate electrode. Such a pulse may be provided, just as in FIG. 4, by a pulse width modulation circuit 148 and a gate drive circuit 150 whenever the auxiliary D.C. output voltage across the output capacitor 152 decays to the designated minimum value. $Q_3$ continues to conduct and charge the output capacitor 152 through a filter inductor 154 until it is cut off by the regulation circuit for the main output D.C. voltage. When $Q_3$ cuts off, no voltage is induced in the secondary winding 144, and no current flows through the SCR device 146. The flyback diode 156 operates in a manner previously explained.

OPERATION OF THE CIRCUIT OF FIG. 6

The operation of the power supply circuit of FIG. 6 can be summarized by reference to the voltage waves of FIG. 7. The wave A is comprised of positive pulses 158 that appear across the primary winding 122 when $Q_3$ is conducting. Its duration or width depends on the time it takes to charge the output capacitor 134 to the maximum designated value. Also, part of the wave A is a negative voltage pulse 160 that is produced by the collapse of the field created by the primary winding 122.

A voltage wave B having corresponding positive and negative pulses 158' and 160' is induced across the secondary winding 128, but because the negative pulses 160' are blocked by the diode 129, the voltage wave at point 130 is as indicated by the wave C having only positive pulses 158". Charging of the output capacitor 134 is therefore limited to the positive pulses 158 as indicated by the shading. The duration of these pulses is determined by the time it takes the main output D.C. voltage 162 of the wave D to reach a predetermined maximum value indicated by the dotted line 164. At this point, as explained in connection with FIG. 4, the pulse width modulation circuit 142 terminates the pulses applied to the base of $Q_3$ by the oscillator 138 and the base drive circuit 140.

During the voltage wave A for the primary winding, a corresponding voltage wave E containing positive pulses 166 and negative pulses 168 is induced across the secondary winding 144 of the auxiliary voltage supply. Although the positive pulses 166 bias the anode path of the SCR device 146 for conduction, conduction cannot take place until a positive pulse, such as shown at 147 in the wave G, is applied to the gate electrode. As explained in connection with FIG. 4, the pulse is produced by the pulse width modulation circuit 148 and the gate drive circuit 150 whenever the auxiliary D.C. output voltage across the capacitor 152 indicated by 170 of a wave F decays to a predetermined minimum value represented by the dotted line 172. When the SCR device 146 conducts, the voltage supplied by the secondary winding appears at the input of the inductor 154, as indicated by the wave H and charges the capacitor 152.

It will be understood that half wave operation of the secondary winding power supply as shown for deriving the auxiliary output voltage circuit of FIG. 6, can be used in conjunction with a circuit providing full wave operation of the primary winding as shown in FIG. 4, but full wave operation of a secondary winding power supply, as shown on the auxiliary output voltage circuit of FIG. 4 requires full wave operation of the primary winding.

ALTERNATIVE EMBODIMENT OF THE INVENTION

In the full wave power supply of FIG. 4 and in the half wave power supply of FIG. 6, the main output voltage is regulated by modulating the width of the pulses of current flowing in the primary winding. Whereas this is desirable when very heavy loads are to be expected on the main output, the arrangement shown in FIG. 8 illustrates a power supply designed for operation with comparable loads on the various outputs. In this particular showing a positive D.C. voltage is derived from any suitable source and applied to an input terminal 176, and the other input terminal 179 is connected to a source of reference potential such as ground. Capacitors 178 and 180 are connected in series between the input terminals 176 and 178 as are the transistors $Q_1$ and $Q_2$. The primary winding 182 of a power transformer is connected between the junction of the capacitors 178 and 180 and the junction of $Q_1$ and $Q_2$. In a manner similar to that described in connection with FIG. 4, an oscillator 184 and a base drive circuit 186 cooperate in a manner well known to those skilled in the art to apply pulses to the base electrodes of the transistors $Q_1$ and $Q_2$ so that they conduct during alternate spaced intervals respectively represented by the pulses 188 and 190 of a waveform W. When $Q_1$ conducts, current flows from the input terminal 176 to the input terminal 178 via the collector-emitter path of $Q_1$, the primary winding 182 and the capacitor 180, and when $Q_2$ conducts, current flows from the input terminal 176 to the input terminal 178 via the capacitor 178, the primary winding 182, and the collector-emitter path of $Q_2$.

Direct current output voltages may be derived from any number of secondary windings of the power transformer, but only two, 192 and 194 are shown. Each is coupled to SCR devices, a filter inductor and an output capacitor in the same way as described in connection with the auxiliary power supply of FIG. 4. The D.C. output voltage across the capacitor is regulated in the same way by a pulse width modulator PWM and a base drive circuit BD. Corresponding components are indicated by the same numerals as in the auxiliary D.C. output of FIG. 4 but the circuit details of the pulse width modulator PWM and the base drive circuit BD are not repeated. As the loads vary, the SCR voltage regulation circuits provide compensation in an efficient manner with very few components.

It will be understood that although the circuit illustrated operates in a full wave manner on both primary and secondary sides of the power transformer that half wave operation can be obtained for the primary winding in a manner similar to that shown in FIG. 6 except that the width of the pulses applied to the base of $Q_3$ would be constant. Half wave operation of a secondary winding can be attained by using a circuit for each secondary winding 192 and 194 that is identical to that shown in FIG. 6 for deriving the auxiliary output from the secondary winding 144.

What is claimed is:

1. A power supply for providing regulated direct current voltages from a source of unregulated direct current voltage, comprising
   a pair of input terminals between which the unregulated direct current voltage may be applied,
   a pair of capacitors connected in series between said terminals,
   a pair of switches connected in series between said terminals,
   a transformer having a primary winding and first and second secondary windings, said primary winding being connected between the junction of said capacitors and the junction of said switches,
   a first output capacitor,
   rectifiers respectively coupled from opposite ends of said first secondary winding to one side of said first output capacitor and a direct current connection between the other side of said first output capacitor and a center point on said first secondary winding,
   means for alternately closing said switches for predetermined spaced periods of time,
   means for changing the time during which said switches are closed inwardly with the variation in voltage across said first output capacitor,
   a second output capacitor,
   SCR devices having gate electrodes and having their source-to-drain paths respectively coupled between opposite ends of said second secondary winding and one side of said second output capacitor and a direct current connection between the other side of said second output capacitor and a center point on said second secondary winding, a comparator having first and second inputs and an output, means coupling the voltage across said second output capacitor to one of said inputs, means coupling a reference potential to the other of said inputs, a pulse transformer having primary and secondary windings, a diode, a capacitor and said primary winding of said pulse transformer being connected in series between the output of said comparator and a point of said reference potential, a transistor having a base, collector and emitter, said base being coupled to the output of said comparator, said emitter being connected to the junction between said diode and said capacitor, and means applying an operating potential to said collector, a connection between said gate electrodes and one side of said secondary winding of said pulse transformer, and a connection between the other side of the secondary winding of said pulse transformer and points respectively between said SCR devices and said second output capacitor.

2. A power supply for providing regulated direct current voltages from a source of unregulated direct current voltage, comprising a pair of input terminals between which an unregulated direct current voltage may be applied, a transformer having a primary winding, a flyback winding connected in series with said primary winding, and first and second secondary windings, a switch coupled in series with said primary winding between said input terminals, a flyback diode connected in series with said flyback winding between said input terminals, a rectifier and a first output capacitor coupled in series across said first secondary winding, means coupled to said first output capacitor and said switch for closing said switch by separated periods of time that vary in duration inversely with the magnitude of the voltage across said first output capacitor, an SCR device having a source, drain and gate, a second output capacitor, means coupling the source-to-drain path of said SCR device in series with said second output capacitor across said second secondary winding, the polarity of said flyback winding with respect to the polarity of said primary winding and the polarity of said flyback diode being such that conduction occurs through said flyback diode when the magnetic field of said primary winding is collapsing, the polarity of said first secondary winding and the polarity of said rectifier being such that conduction occurs therein when said switch is closed, the polarity of said second secondary winding and the polarity of the source-to-drain path of said SCR device being such that conduction occurs therein whenever said switch is closed, a comparator having first and second inputs and an output, means coupling the voltage across said second output capacitor to one of said inputs, means coupling a reference potential to the other of said inputs, a pulse transformer having primary and secondary windings, a diode, a capacitor and said primary winding of said pulse transformer being connected in series between the output of said comparator and a point of said reference potential, a transistor having a base, collector and emitter, said base being coupled to the output of said comparator, said emitter being connected to the junction between said diode and said capacitor, and means applying an operating potential to said collector, a connection between said gate electrode and one side of said secondary winding of said pulse transformer, and a connection between a point between said SCR device and said second output capacitor and the other side of the secondary winding of said pulse transformer.

* * * * *